(12) United States Patent
Kasai

(10) Patent No.: US 7,145,879 B1
(45) Date of Patent: Dec. 5, 2006

(54) NETWORK LOAD TESTING METHOD

(75) Inventor: Kazunori Kasai, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 628 days.

(21) Appl. No.: 09/714,155

(22) Filed: Nov. 17, 2000

(30) Foreign Application Priority Data

Jan. 31, 2000 (JP) .............................. 2000-021144

(51) Int. Cl.
*G01R 31/08* (2006.01)
*G06F 11/00* (2006.01)

(52) U.S. Cl. .................... 370/241.1; 370/248; 370/249

(58) Field of Classification Search ................ 370/249, 370/248–250, 252, 253, 241.1, 229, 230.1, 370/232; 702/117–119; 398/167; 379/22.01; 375/221; 714/716
See application file for complete search history.

(56) References Cited

U.S. PATENT DOCUMENTS

| | | | |
|---|---|---|---|
| 5,477,531 A * | 12/1995 | McKee et al. | 370/249 |
| 5,659,540 A * | 8/1997 | Chen et al. | 370/249 |
| 5,668,800 A * | 9/1997 | Stevenson | 370/248 |
| 5,812,528 A * | 9/1998 | VanDervort | 370/235 |
| 5,940,375 A * | 8/1999 | Soumiya et al. | 370/249 |
| 6,515,967 B1 * | 2/2003 | Wei et al. | 370/244 |

FOREIGN PATENT DOCUMENTS

| | | |
|---|---|---|
| JP | 5-276173 | 10/1993 |
| JP | 9-214494 | 8/1997 |
| WO | WO99/41889 | 8/1999 |

* cited by examiner

*Primary Examiner*—Doris H. To
*Assistant Examiner*—Ian N. Moore
(74) *Attorney, Agent, or Firm*—Staas & Halsey LLP

(57) ABSTRACT

A method for testing a network load in which a transmission at an own apparatus side is not stopped based on a reception completion at a mating apparatus side, and a transmission at the own apparatus side is stopped based on the reception completion at the own apparatus side itself is provided. Thus, an inter-task communication for synchronizing the apparatuses with each other is not required, and it is possible to decrease a time required for the inter-task communication during a test cycle. Accordingly, since a test cycle is shortened, and transmission time and reception time of test data in the test cycle relatively prolonged, it is possible to increase data transfer per unit time and provide a large load to a network.

3 Claims, 5 Drawing Sheets

NETWORK LOAD TESTING METHOD

BACKGROUND OF THE INVENTION

1. Field of the Invention

The present invention relates to a network load testing method in which loads are imparted to a network such as a local area network (LAN) through data transfer on the network.

2. Description of the Related Arts

The network load testing is carried out before the shipment of the apparatuses or after the establishment of the network, the method including imparting loads to network adapters mounted on the apparatuses making up the network or to network transmission lines, to thereby judge the network performances.

FIG. 5 is a view for explaining a method for testing a network load in the prior art. In FIG. 5, apparatuses A, B are connected to the network such as LAN, etc. Each of the apparatuses A, B comprises a processor module (CPU) 10 for controlling a communication, and a network adapter (interface board) 20 for transmitting and receiving data. The network adapter (interface board) in the case where the network is the LAN is a so-called LAN card. The network adapter 20 comprises a transmitter 21 and a receiver 22. The processor module 10 is connected to the network adapter 20 via a LS bus 20. A test program for testing the network load is loaded to both the apparatuses A, B as structured above, and the test program is executed in both the apparatus, whereby the method for testing the network load is executed.

Data are transferred between the apparatuses A and B via the network. Specifically, data transmitted from a transmitter 21A of the apparatus A are received by a receiver 22B of the apparatus B via the network, and data transmitted from a transmitter 21B of the apparatus B are received by the receiver 21A of the apparatus A via the network. While the test for loading the network is executed, the data are transferred in both directions of the apparatuses A, B. As the data transfer from the apparatus B to the apparatus A is same as the data transfer from the apparatus A to the apparatus B, hereinafter, the data transfer from the apparatus A to the apparatus B will be explained. Furthermore, a communication as explained below is one (inter-task communication) between programs which is executed by the processor module 10 and network adapter 20.

According to a transmission start command from a processor module 10A of the apparatus A, the receiver 21A of the apparatus A starts transmitting test data in packet unit. The receiver 22B of the apparatus B counts the number of reception (the number of packet), while receives the test data transmitted in sequence from the transmitter 21A.

When the receiver 22B receives data of the predetermined number of packets (for example, 128 packets), it notifies a processor module 10B of the apparatus B of reception completion by way of a LS bus 30B (communication ① of FIG. 5). The processor module 10B notifies the processor module 10A of the apparatus A of the reception completion by making use of a communication a path other than a test targeting network (for example, RS232C, or the like) (communication ② of FIG. 5). As the network is a target of the test, it is not utilized for an inter-task communication. According to a notification of the reception completion, the processor module 10A notifies a transmission stop command the transmitter 21A by way of the LS bus 30A (communication ③ of FIG. 5). Furthermore, when the transmitter 21A stops the transmission, it notifies the receiver 22A of a transmission stop.

On the other hand, when the receiver 22A of the apparatus A receives the test data from the transmitter 21B of the apparatus B, as described above, the receiver 22A notifies the processor module 10A of the reception completion (communication ④ of FIG. 5).

When the receiver 22A notices the reception completion and receives a transmission stop, the receiver 22A notifies the processor module 10A of a transmission and reception completion by way of the LS bus 30A (communication ⑤ of FIG. 5). Thus, 1 cycle of the test is ended. Furthermore, the receiver 22A notices the transmission and reception completion, thereby becoming a reception READY condition in a next test cycle.

FIG. 6 is a timing chart of a method for testing a network load in the prior art. FIG. 6 shows the timing chart of the transmitters 21A, 21B and receivers 22A, 22B in the respective apparatuses A, B. Encircled digits in each timing chart indicate communication time of each communication. Accordingly, for example, even when a reception of the test data of the receiver 22B of the apparatus B is ended, the transmitter 21A of the apparatus A continues to transmit, and stops a transmission by the reception of the transmission stop notice.

In FIG. 5 or 6, when the processor module 10A receives the notice of the reception completion from the receiver 22A, the processor module 10A transmits the reception READY condition notice for starting a next test cycle to the apparatus B. The transmitter 21 starts transmitting after a receiver 22 of a mating apparatus becomes in a reception READY condition. In more details, the processor module 10A utilizes a communication path different from the above testing network, and transmits the reception READY condition notice to the processor module 10B (communication ⑥ of FIG. 5). The processor module 10B transmits a transmission start command to the transmitter 21B (communication ⑦ of FIG. 5).

When the transmitter 21B receives the transmission start command, the transmitter 21B restarts transmitting the test data. In this manner, in the method for testing the network load in the prior art, one apparatus does not transmit the test data until the other apparatus becomes in the reception READY condition. Namely, both the apparatuses are synchronized with each other, while the data are transmitted and received, and during a predetermined test time, the test cycle is repeated.

However, the above method for testing the network load in the prior art has the following drawbacks:

First, during a span between the reception of the test data and a next reception in the test cycle, the inter-task communication for synchronizing the apparatuses with each other (the respective communications ①→②→③→④→⑤→⑥→⑦ of FIGS. 5 and 6) intervenes, and a time which is required for the inter-task communication is relatively long. For this reason, a transmission and reception period during the test cycle is relatively short, and also the cycle of the test cycle is prolonged. Therefore, it is impossible to give a high load which leads out a limit of performance to the network adapter.

Second, as the communication path (for example, RS232C, or the like) different from the test targeting network is necessary for the inter-task communication between the apparatuses, a test environment and test facility are troublesome.

In this manner, in the conventional method for testing by synchronization in which the transmission does not start until a mating side becomes in the reception READY condition in each test cycle, a certain time is required for the inter-task communication. Therefore, the high load is not given to the network (network adapter and communication path), and also it is necessary that another communication path is prepared.

SUMMARY OF THE INVENTION

It is therefore an object of the present invention to provide a network load testing method allowing increased loads to be imparted to a network.

It is another object of the present invention to provide a network load testing method needing no communication paths different from the network to be tested.

In order to achieve the above objects, according to an aspect of the present invention there is provided a network load testing method in which loads are imparted to a network by transfer of data among a plurality of apparatuses connected to the network, the method comprising the steps of: transmitting data from each apparatus to at least another apparatus; receiving the data in each apparatus from at least another apparatus; and controlling the data transmitting condition in each apparatus on the basis of the data receiving condition in each apparatus. Preferably, in the control step, when each apparatus receives a predetermined number of data, data transmitting from each apparatus is stopped.

In this manner, in the method for testing the network load according to the present invention, differing from the conventional testing method, a transmission at a transmitting apparatus side is not stopped, based on a reception completion at a mating apparatus side; instead, the transmission at the transmitting apparatus side is stopped based on the reception completion at the transmitting apparatus sides itself. Thus, an inter-task communication for synchronizing the apparatuses with each other is not required, and it is possible to significantly decrease a time required for the inter-task communication during test cycle, more than in the conventional testing method. Accordingly, as it is possible to shorten a cycle of 1 test cycle, and relatively prolong a transmission time and reception time of test data in the 1 test cycle, it is possible to increase a data transfer amount per unit time and give a high load to a network.

Furthermore, in the method for testing the network load according to the present invention, the transmission at the transmitting apparatus side is stopped, based on the reception completion at the transmitting apparatus sides itself, and the separate or mating, transmitting and receiving apparatuses are not synchronized with each other. Therefore, inter-task communications between the apparatuses are not required, and a communication path, other than and different from the test targeting network, is not required. Accordingly, the test environment and test facility can be simplified.

DESCRIPTION OF THE PREFERRED EMBODIMENTS

Presently preferred embodiments of the present invention will now be explained. However, the technical scope of the present invention is not limited to the embodiments.

Figure 1:
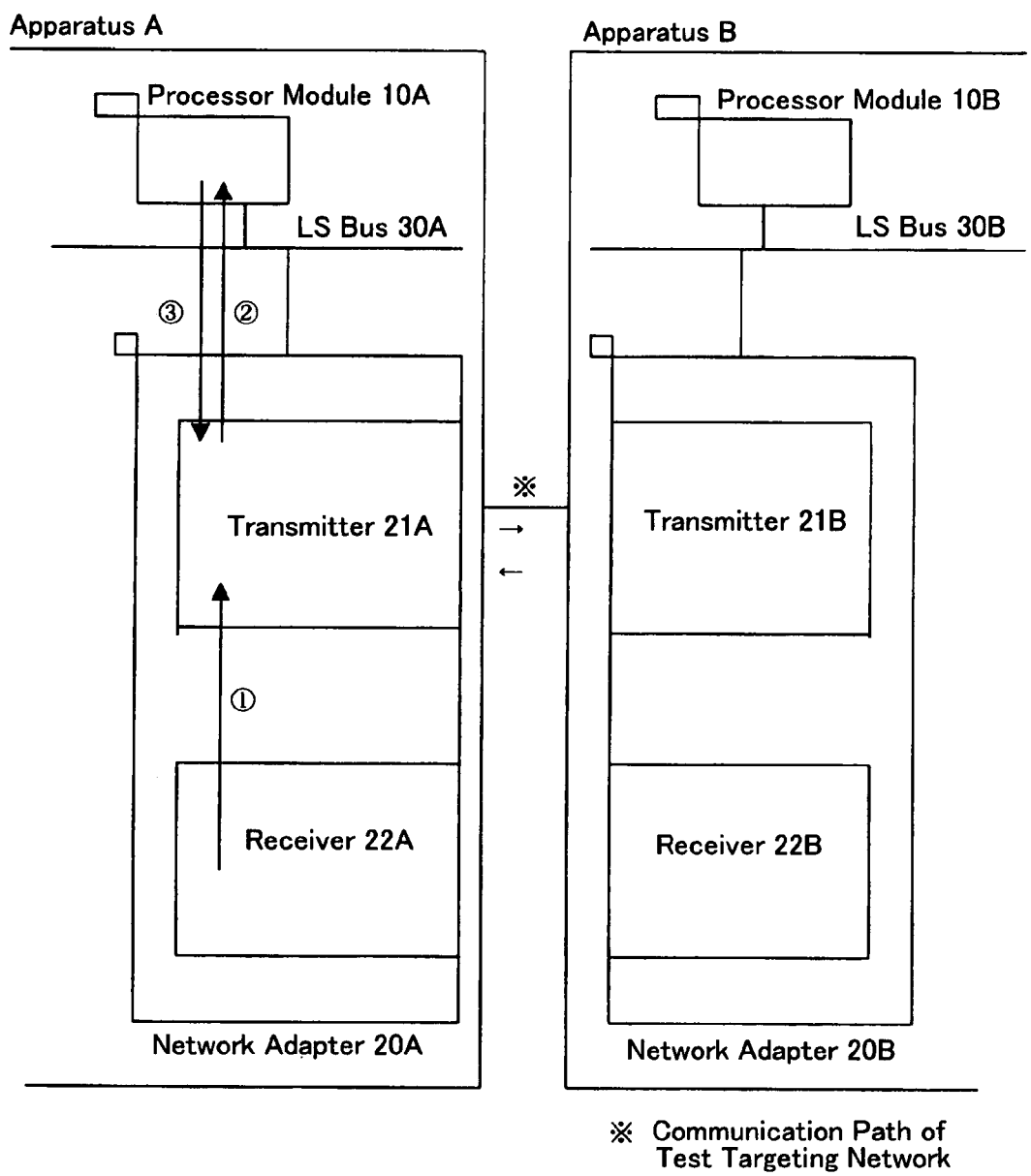
FIG. 1 is a diagram for explaining a method for testing a network load according to an embodiment of the present invention.
Figure 5:
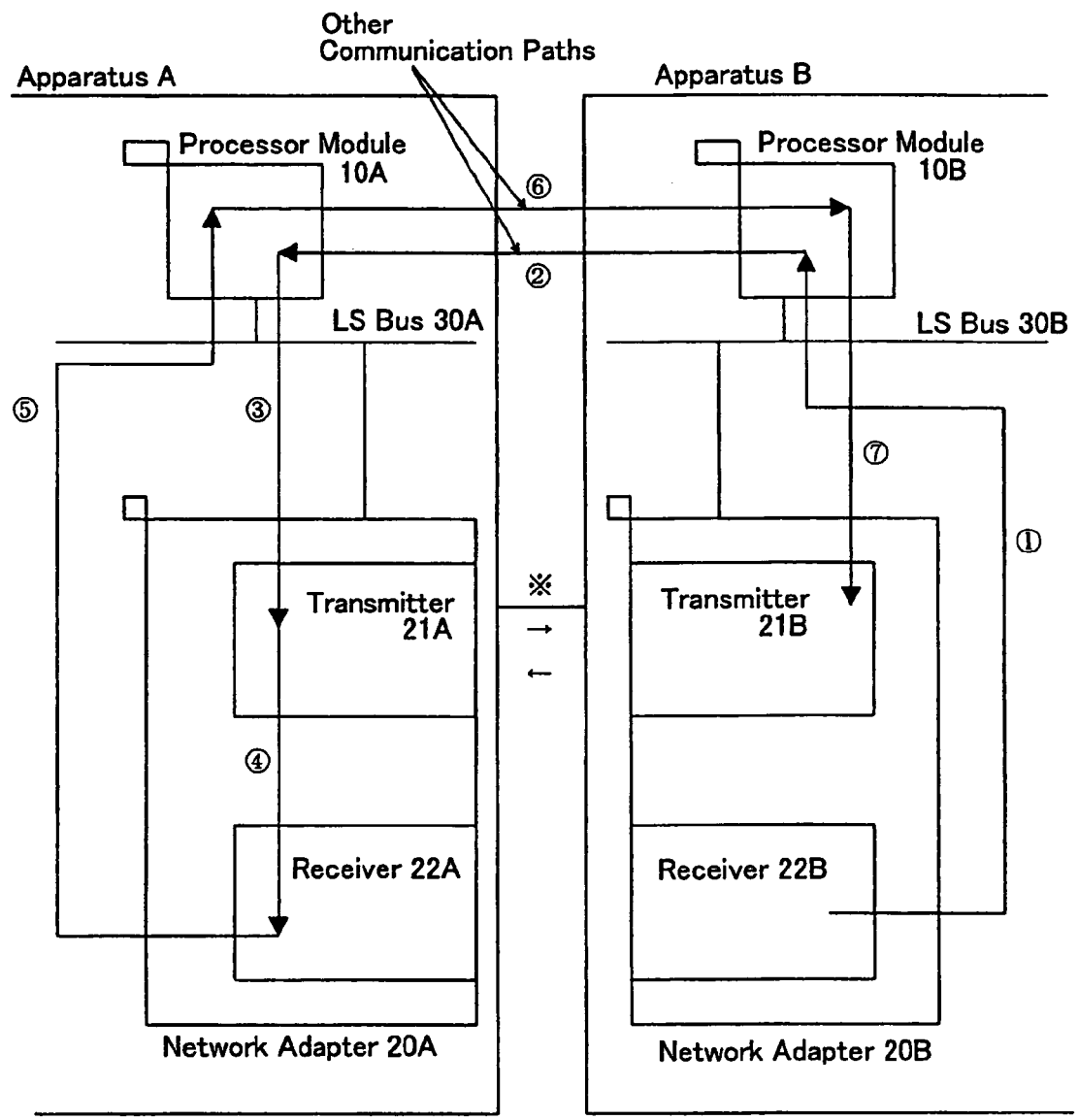
FIG. 5 is a diagram for explaining a conventional method for testing a network load.

FIG. 1 is a diagram for explaining a method for testing a network load according to an embodiment of the present invention. A configuration of apparatuses A, B in FIG. 1 is same as in FIG. 5, and each of the apparatuses A, B comprises a processor module (CPU) 10 for controlling a communication, and a network adapter (interface board) 20 for transmitting and receiving data. The data transmitted from a transmitter 21A of a network adapter 20A of the apparatus A are received by a receiver 22B of a network adapter 20B of the apparatus B via a network, and the data transmitted from a transmitter 21B of the apparatus B are received by the receiver 22A of the apparatus A via the network. However, the apparatuses A, B are not connected via a communication path other than a test targeting network. Furthermore, while the test of the network load is executed, the data are transferred in both directions between the apparatuses A, B, but as a data transmitting from the apparatus B to the apparatus A and a data transmitting from the apparatus A to the apparatus B are same, in this embodiment, an inter-task communication in the data transfer from the apparatus B to the apparatus A will be explained.

Figure 2:
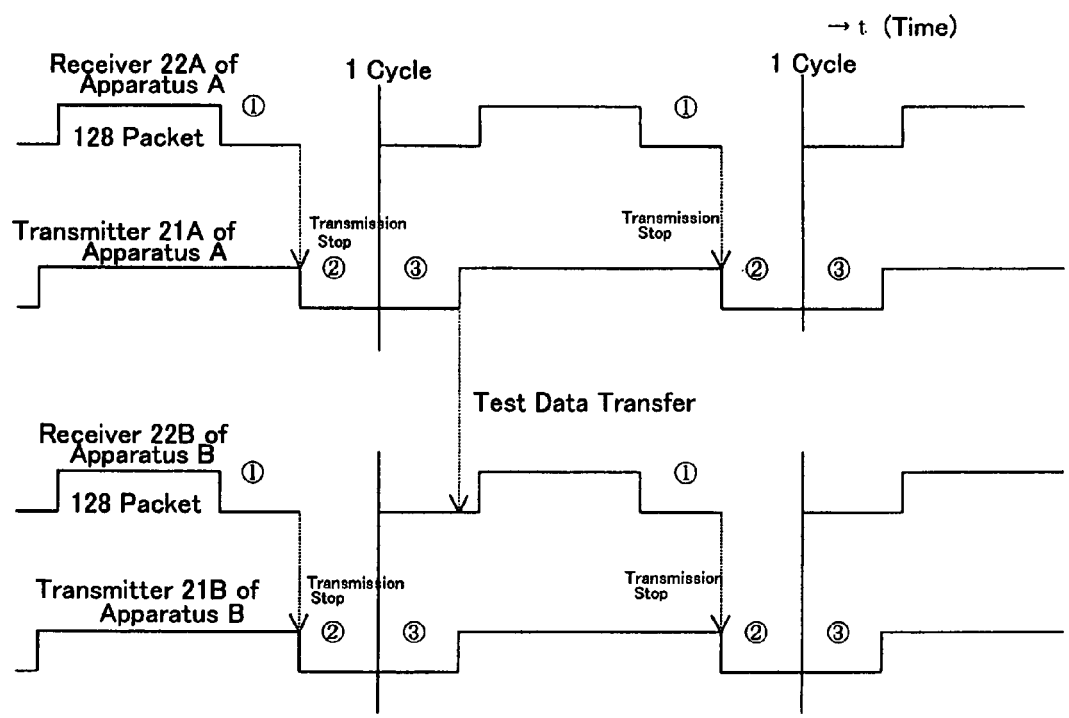
FIG. 2 shows a first example of a timing chart of the method for testing the network load according to the embodiment of the present invention.
Figure 6:
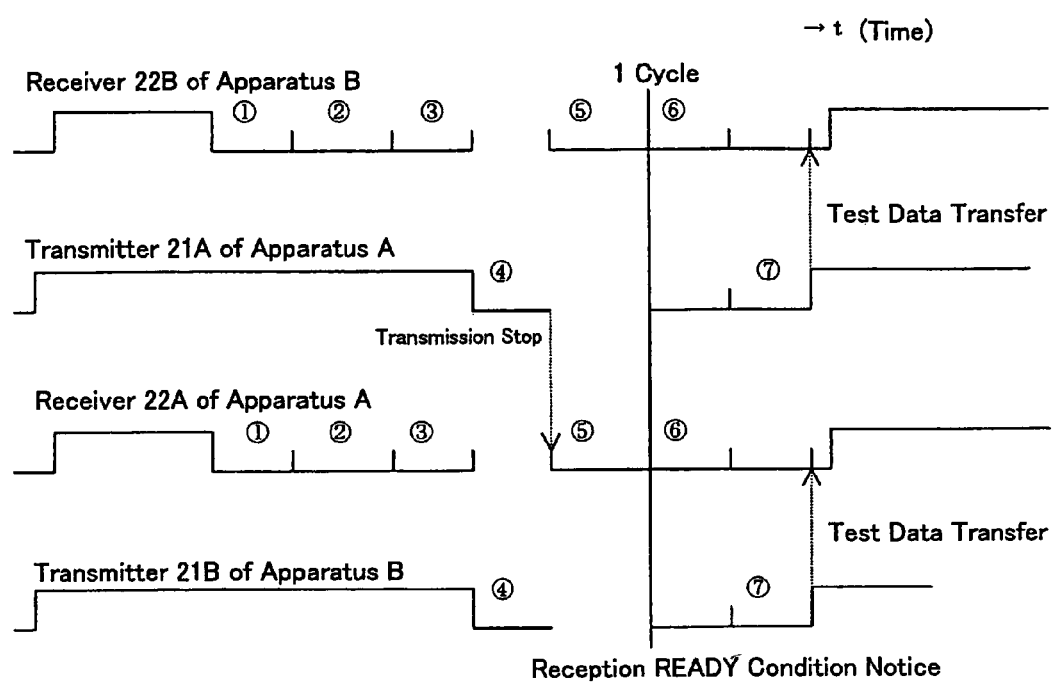
FIG. 6 is a timing chart of the conventional method for testing a network load.

Furthermore, FIG. 2 is a first example of a timing chart of the method for testing the network load according to the embodiment of the present invention. FIG. 2 shows a timing chart of the transmitters 21A, 21B and receivers 22A, 22B in the respective apparatuses A, B, in the same manner as in FIG. 6. Encircled digits in each timing chart represent communication times of each inter-task communication.

In FIGS. 1 and 2, in accordance with a command from a processor module 10B of the apparatus B, the transmitter 21B of the apparatus B starts transmitting test data in packet units. The receiver 22A of the apparatus A counts the number of reception (the number of packets), while receiving the test data transmitted in sequence from the transmitter 21B.

When the receiver 22A receives data of the predetermined number of packets (for example, 128 packets), the receiver 22A notifies the transmitter 21A of the apparatus A of a transmission stop command (communication 1). When the transmitter 21A receives the transmission stop command, the transmitter 21A stops transmitting. Furthermore, when the transmitter 21A stops transmitting, the transmitter 21A notifies a transmission and reception completion to a processor module 10A by way of LS bus 30A (communication ②). The processor module 10A recognizes an end of 1 test cycle based on a reception of a notification of the transmission and reception completion. Next, the processor module 10A of the apparatus A notifies the transmission start command for a next test cycle to the transmitter 21A by way of the LS bus 30A (communication ③). In this manner, the transmitter 21A starts transmitting test data in the next test cycle. The test cycle is repeated during a predetermined test time. Incidentally, after the receiver 22A notifies a transmission stop to the transmitter 21A, the receiver 22A becomes in the reception READY condition.

In this manner, according to this embodiment, the transmitter 21 of the respective apparatuses A, B stops transmitting not in accordance with a reception completion of the receiver of the mating apparatus, but in accordance with a reception completion of the receiver of the common apparatus. Namely, the respective apparatuses A and B are not synchronized with each other, and the respective processor modules 10 judge, mutually independently, an end of 1 test cycle based on the reception completion of the receiver 22 of the common apparatus.

The timing chart of FIG. 2 is an example in the case where the network adapters 20A, 20B mounted on the respective apparatuses A, B are normally operated. Accordingly, as the test data are normally transmitted and received between the apparatuses A, B, although the apparatuses A, B are not synchronized with each other, the test cycle is ended at the same timing.

Figure 3:
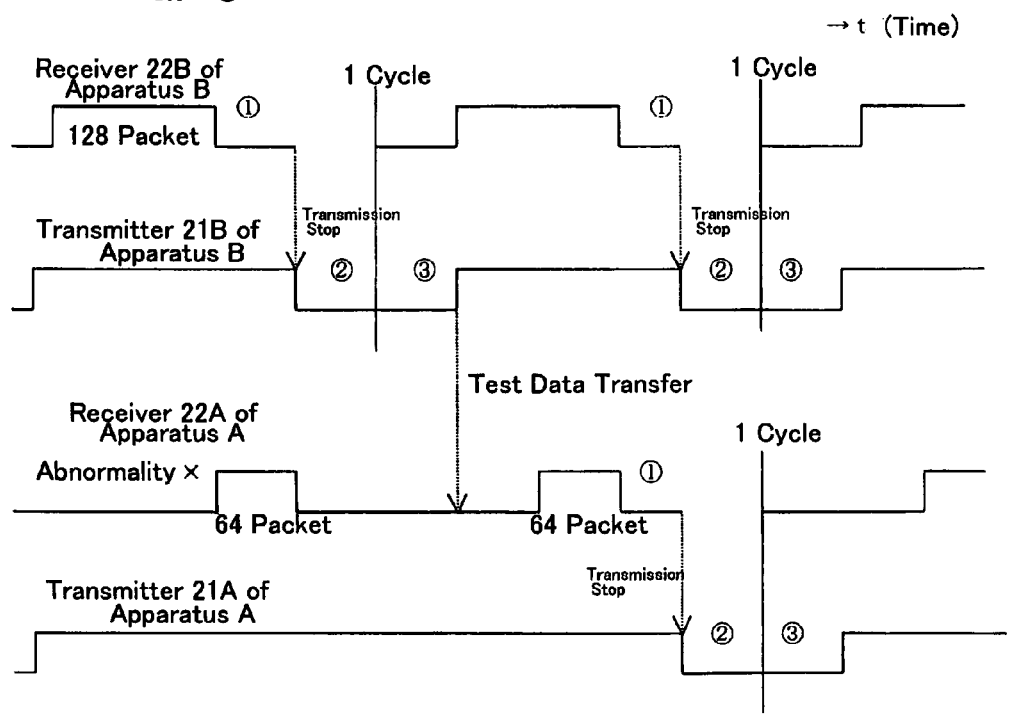
FIG. 3 shows a second example of a timing chart of the method for testing the network load according to the embodiment of the present invention.

FIG. 3 is a second example of a timing chart of a method for testing a network load according to the embodiment of the present invention. The second example of FIG. 3 shows the case where a defect occurs in the receiver 22B of the network adapter 20B of the apparatus B. In FIG. 3, the receiver 22A of the apparatus A receives the test data of the predetermined number of packets (for example, 128 packets) during the 1 test cycle, and stops a transmission of the transmitter 21A, and ends the 1 test cycle. On the other hand, the receiver 22B of the apparatus B does not receive the test data of the predetermined number of packets during the 1 test cycle of the apparatus A due to abnormalities (slowdown) of the receipt condition. In FIG. 3, as an example, the receiver 22B receives half (64 packets) the predetermined number of packets (128 packets). In this case, as the transmitter 21B of the apparatus B has no connection with the reception completion of the receiver 22A of the apparatus A, the transmitter 21B does not stop transmitting.

Furthermore, until the receiver 22B of the apparatus B receives the test data transmitted in the test cycles the next time on in the apparatus A, and receives the test data of the predetermined number of packets, the receiver 22B does not complete the reception. For example, in the case where the receiver 22B receives the test data in which the number of received packets is 64 packets in the next test cycle of the apparatus A, and reaches the predetermined number of packets (128 packets), the transmitter 21B of the apparatus B stops transmitting by the communication ① based on the reception completion of the receiver 22B, and the processor module 10B recognizes an end of 1 test cycle by the communication ②.

Each time the respective processor modules 10A, 10B receive a notice of a transmission and reception completion (the communication ②) from the respective transmitters 21A, 21B (each time a cycle ends), the number of cycles is counted up.

As described above, in the case where there are abnormalities in the one network adapter 20, as cycles of the test cycle in the respective apparatuses A, B are different, resultantly, the number of cycles in which the respective apparatuses A, B count up during a predetermined test period is different. For example, in the case of FIG. 3, the number of cycles in apparatus B is substantially about half the number of cycles in the apparatus A.

Accordingly, based on a comparison of the number of cycles obtained in the respective apparatuses A, B, it is possible to judge performance of the network adapter mounted in the respective apparatuses A, B. For example, in the case where the number of the one cycle is less than that of the other cycle, it can be judged that there are any faults, abnormalities in the one network adapter.

In this manner, the method for testing the network load according to the present invention does not stop a transmission of the transmitter of the own apparatus based on the reception completion of the receiver of the mating apparatus, but stops a transmission of the transmitter 21 of the own apparatus based on the reception completion of the receiver 22 of the own apparatus, differing from the conventional testing method. Thus, the inter-task communication for synchronizing the apparatuses with each other is not required, and it is possible to fairly decrease a time of the inter-task communication ((①→②→③)) during the 1 test cycle more than the conventional testing method. Accordingly, as it is possible to shorten the cycle of the 1 test cycle, and to relatively prolong a transmission time and reception time of the test data during the 1 test cycle, it is possible to give a high load to the network (network adapter and communication path).

Furthermore, as, in the method for testing the network load according to the present invention, the apparatuses A, B are not synchronized with each other, the inter-task communication between the apparatuses A, B is not required, and another communication path in the conventional testing method is not required. Accordingly, the test environment and test facility can be simplified.

Incidentally, the method for testing the network load according to the present invention is applied between two sets of apparatus connected to the network, but the present invention is not limited thereto. As, in the method for testing the network load according to the present invention, it is not required to synchronize with the mating apparatus, the present invention can be applied to between three sets or more of apparatus. Since the test data are transmitted and received between the three sets or more of apparatus, for example, a MAC address peculiar to the network adapter mounted in the respective apparatuses is utilized.

Figure 4:
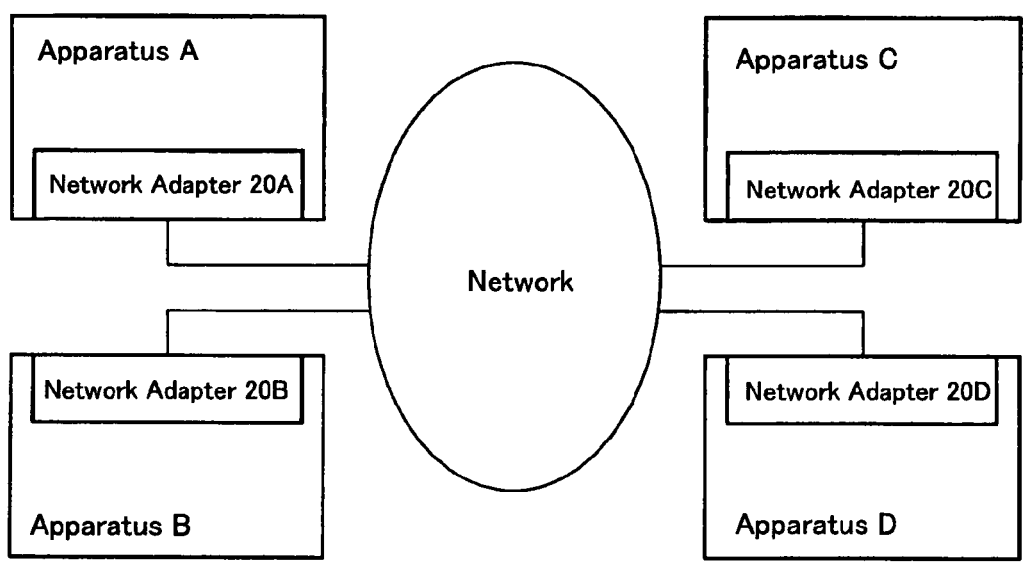
FIG. 4 is a typical diagram of a network connected to three sets or more of apparatus.

FIG. 4 is a typical diagram of a network connected to three sets or more of apparatus. In FIG. 4, the four sets of apparatus A, B, C, D are connected to the network. The network adapters 20A, 20B, 20C, 20D are mounted on the respective apparatuses A, B, C, D, respectively. In FIG. 4, the method for testing the network load between the apparatuses A, B is same as in the above embodiment. In the case of such a one-to-one communication (uni-cast communication), the apparatuses A, B specify the MAC addresses of the mating (addressee) apparatuses, respectively, to transmit the test data.

Furthermore, in the case where the method for testing the network load according to the present invention is executed between all the apparatuses A, B, C, D connected to the network, the respective apparatuses A, B, C, D transmit the test data having a broadcast address as the MAC address of the addressee. The test address having the broadcast address are fetched in all the apparatus other than the own apparatus of the addresser.

Furthermore, in the case where the method for testing the network load is executed between, for example, the apparatuses A, B, C, out of the apparatuses A, B, C, D connected to the network, a multi-cast is exploited. Specifically, the plurality of apparatuses A, B, C have in advance been grouped, and the test data having the MAC address of the apparatus included in the group are transmitted. The test data having the MAC address in response to the groups are fetched in by the apparatuses included in the group. In this manner, by exploiting the broad cast and multi-cast, it becomes possible to carry out the network load testing according to the present invention in a multiplicity-to-multiplicity communication.

Incidentally, the aforesaid embodiment was explained with the LAN as an example, but the network to which the present invention is applied is not limited to the LAN. For example, the method for testing the network load according to the present invention is similarly applicable to various networks such as a telephone line net, a dedicated line net, a DDX-P net, an ISDN net, or the like.

Thus, in the method for testing the network load according to the present invention, differing from the conventional testing method, a transmission at an own apparatus side is not stopped based on a reception completion at a mating apparatus side, and the transmission at the own apparatus side is stopped based on the reception completion at the own apparatus side itself. In this manner, an inter-task communication for synchronizing the apparatuses with each other is not required, and it is possible to fairly decrease a time required for the inter-task communication during 1 test cycle more than in the conventional testing method. Accordingly, as it is possible to shorten a cycle of 1 test cycle, and relatively prolong a transmission time and reception time of test data in the 1 test cycle, it is possible to increase a data transfer amount per unit time and give a high load to a network.

Furthermore, in the method for testing the network load according to the present invention, the transmission at the own apparatus side is stopped based on the reception completion at the own apparatus side itself and the apparatuses are not synchronized with each other. Therefore, the inter-task communication between the apparatuses is not required, and the communication path other than and different from the test targeting network is not required. Accordingly, the test environment and test facility can be simplified.

The scope of protection of the present invention is not limited to the above embodiments and covers the invention defined in the appended claims and equivalents thereof.

What is claimed is:

1. A network load testing method in which loads are imparted to a network by transfer of data among a plurality of mating apparatuses connected to the network, each apparatus having a transmitting condition and a receiving condition and being selectively controllable to transmit data to a receiver of a mating apparatus and to receive data transmitted thereto by a transmitter of a mating apparatus, the method comprising:

transmitting data from an individual one, to a mating one, of said plurality of apparatuses;

receiving data in the individual one, transmitted thereto from the mating one, of said plurality of apparatuses; and controlling the data transmitting condition of the individual one of said plurality of apparatuses on the basis of the data receiving condition of that individual apparatus, the controlling further comprising:

detecting when the individual apparatus receives a predetermined number of data and, in response to the detecting of when the individual apparatus receives the predetermined number of data, terminating a further transmitting of data remaining to be transferred from the individual apparatus, after stopping the transmission of data transmitting from each apparatus before all the data is transmitted, restarting the transmission data transmitting from each apparatus, counting a reception number of the predetermined number of data in a predetermined period in each apparatus, and determining an abnormality of the network by comparing respective reception numbers counted by the plurality of apparatuses.

2. The network load testing method according to claim 1, wherein the network is a local area network (LAN).

3. A recording medium encoded with an ecectutable program for a network load testing method in which loads are imparted to a network by transfer of data among a plurality of apparatuses connected to the network, the executable program comprising:

transmitting data from each apparatus to at least another apparatus;

receiving the data in each apparatus from at least another apparatus; and controlling the data transmitting condition in each apparatus on the basis of the data receiving condition in each apparatus, the controlling further comprising:

detecting when the individual apparatus receives a predetermined number of data and, in response to the detecting of when the individual apparatus receives the predetermined number of data, terminating a further transmitting of data remaining to be transferred from the individual apparatus, after stopping the transmission of data transmitting from each apparatus before all the data is transmitted, restarting the transmission data transmitting from each apparatus, counting a reception number of the predetermined number of data in a predetermined period in each apparatus, and determining an abnormality of the network by comparing respective reception numbers counted by the plurality of apparatuses.

* * * * *

UNITED STATES PATENT AND TRADEMARK OFFICE
CERTIFICATE OF CORRECTION

PATENT NO. : 7,145,879 B1 Page 1 of 1
APPLICATION NO. : 09/714155
DATED : December 5, 2006
INVENTOR(S) : Kazunori Kasai It is certified that error appears in the above-identified patent and that said Letters Patent is hereby corrected as shown below:

Column 8, Line 19, change "ececutable" to --executable--.

Signed and Sealed this

Twenty-second Day of May, 2007

JON W. DUDAS
*Director of the United States Patent and Trademark Office*